(12) United States Patent
Dableh

(10) Patent No.: US 10,798,800 B2
(45) Date of Patent: *Oct. 6, 2020

(54) SYSTEM AND METHOD FOR AUTOMATICALLY CREATING AND OPERATING A FUNCTIONAL ASSOCIATION OF LIGHTS

(71) Applicant: JDRF Electromag Engineering Inc., Ontario (CA)

(72) Inventor: Roumanos Dableh, Oakville (CA)

(73) Assignee: JDRF Electromag Engineering Inc., Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/601,443

(22) Filed: Oct. 14, 2019

(65) Prior Publication Data

US 2020/0120780 A1    Apr. 16, 2020

Related U.S. Application Data

(63) Continuation of application No. 16/030,797, filed on Jul. 9, 2018, now Pat. No. 10,448,482, which is a (Continued)

(51) Int. Cl.
*H05B 37/02*    (2006.01)
*F21V 23/04*    (2006.01)
(Continued)

(52) U.S. Cl.
CPC .......... *H05B 47/11* (2020.01); *F21V 23/0442* (2013.01); *H05B 47/105* (2020.01); (Continued)

(58) Field of Classification Search
CPC ...... H05B 47/105; H05B 47/19; H05B 47/11; H05B 47/175; H05B 47/22; H05B 47/155; H05B 45/10; H05B 45/20; H05B 47/10; H05B 45/00; H05B 41/36; H05B 45/24; Y02B 20/46; Y02B 20/48; Y02B 20/44; F21V 23/045; F21V 23/0471; F21V 23/0442
See application file for complete search history.

(56) References Cited

U.S. PATENT DOCUMENTS 9,006,996 B2 * 4/2015 Mohan ................. H05B 47/105
                                                    315/307
9,220,156 B2 * 12/2015 Bishop ................... H05B 47/16
(Continued)

FOREIGN PATENT DOCUMENTS

WO    WO2015103482 A1    7/2015

*Primary Examiner* — Vibol Tan

(57) ABSTRACT

A system and a method for automatically creating and operating a functional association of multiple luminaires is proposed. The system consists of two or more devices that each contain one or more sensors, logic processing circuitry and communication circuitry that is able to transmit messages between devices. The set of devices that constitute the members of a functional association is selected from a larger set of candidate devices. The selection process involves each device comparing the sensor data received from neighbouring devices relating to occupancy and daylight sensors against the device's occupancy and daylight sensor data.

8 Claims, 11 Drawing Sheets

Related U.S. Application Data continuation-in-part of application No. 15/584,678, filed on May 2, 2017, now Pat. No. 10,021,771.

(51) Int. Cl.
| | |
|---|---|
| *H05B 37/03* | (2006.01) |
| *H05B 47/11* | (2020.01) |
| *H05B 47/19* | (2020.01) |
| *H05B 47/105* | (2020.01) |
| *H05B 47/155* | (2020.01) |

(52) U.S. Cl.
CPC ........... *H05B 47/155* (2020.01); *H05B 47/19* (2020.01); *F21V 23/045* (2013.01); *F21V 23/0471* (2013.01)

(56) References Cited

U.S. PATENT DOCUMENTS 10,117,308 B2 * 10/2018 Patel ..................... H04W 76/25
10,448,482 B2 * 10/2019 Dableh ................ H05B 47/155

\* cited by examiner

Let $\sigma^2$ represent the variance in values along the vertical axis within the selected time interval $$\sigma^2 = \frac{1}{n}\sum_{i=1}^{n}(I_i - I)^2$$

$I_i$ represents the light level of the $i^{th}$ sample
$I$ represents the average (mean) light level Let $A_{d1}$ represent the area under the daylight curve between in a fixed time interval $$A_{d1} = \int_{t_1}^{t_2} f_1(t)\, dt$$

Figure 10

$$\text{Group Status} =$$

$$|\text{Local Integral Value - Remote Integral Values}| < \varepsilon_1$$
$$\&$$
$$|\text{Local Variance Value - Remote Variance Values}| < \varepsilon_2$$

$\varepsilon_1, \varepsilon_2$ represent similarity threshold of Area and Variance Values, respectively
Group Status = $\{0,1\} \in \mathbb{R}^{n-1}$

Figure 12

$$History := History + a \cdot s(t)$$

$$Group\ Status = History > \varepsilon_3$$

a represents a weighting factor applied to the most recent score
$\varepsilon_3$ represent similarity threshold of occupancy history
Group Status = $\{0,1\} \in \mathbb{R}^{n-1}$

SYSTEM AND METHOD FOR AUTOMATICALLY CREATING AND OPERATING A FUNCTIONAL ASSOCIATION OF LIGHTS

TECHNICAL FIELD

This invention relates to the installation and maintenance of luminaires. More specifically, the invention relates to the control of luminaires in groups.

BACKGROUND

Light management system (LMS) may use a functional association of luminaires. Such an association may include luminaires associated based on for example daylight harvesting or occupancy detection. Some existing light management systems may use low voltage wiring or a logical addressing scheme to control a group of associated luminaires. Low voltage wiring connecting each of the luminaires in the association determines membership of devices in a functional association by physically connecting all member devices together on a common channel.

Logical addressing schemes may be used in digital LMS (wired or wireless) to define membership in a functional association. Setting up a digital LMS typically requires devices that are first distinguished from one another by causing them to produce a visual pattern that is noticeable by a technician. Software is then used to read the unique identifier of a visually distinguishable device to correlate the identifier to one or more physical devices. Once identified, each device is manually added to one or more functional associations.

This is a prescriptive process whereby the correlation of devices depends on a logical network address to map devices to the same functional association. During operation, the logical address is encoded in the communication signal according to rules set by the communication protocol. Logical address types may include broadcast, multi-cast and uni-cast addresses used to transmit data to all nodes, a group of nodes or a unique node connected to a network, respectively.

Every device that receives the communication message may then determine whether or not to process and respond to the message based on its membership in the given logical address type.

Building automation systems may include LMS in addition to other systems such as HVAC (heating, ventilation and air conditioning) and shading. Such systems may have a common control systems, share user interfaces and share sensors and feedback mechanisms.

Although existing systems may provide some control over LMS, they may not provide optimal, efficient setup and control.

SUMMARY

A light management system is described that comprises two or more light fixtures in communication with each other. The light fixtures track one or more sensors or inputs, namely occupancy and daylight. Patterns of inputs are compared with neighbouring light fixtures and light fixtures with common patterns of inputs are grouped. Grouped light fixtures operate as a group, such as by turning off and on as a group.

BRIEF DESCRIPTION OF THE DRAWINGS

In drawings which illustrate by way of example an embodiment:

FIG. 10 is a example of a method to determine the group status of a neighbouring device.

FIG. 12 illustrates a method for determining cumulative history and occupancy group status.

DETAILED DESCRIPTION

A functional association is a collection of multiple devices that work together in order achieve a specific objective. Member devices may share input data, run processing algorithms and coordinate their output state. Automation object refers to a control device and one or more illumination elements or luminaires.

In the context of a LMS, a functional association relates to lights or luminaires and associated sensors. As an example, a functional association may consist of a sensor that detects occupancy and the luminaire(s) that respond to the state of the sensor. In this example, the shared input data is the state of the sensor, which can be in an occupied or a vacant state. The desired objective is for all luminaire(s) to respond simultaneously to changes in the sensor state. The response may be as simple as setting the output state of the luminaires to light levels of 100% and 0% for the occupancy and vacancy, respectively. The response may be more complex, involving transition levels, vacancy warnings and a variable fade time.

Figure 1:
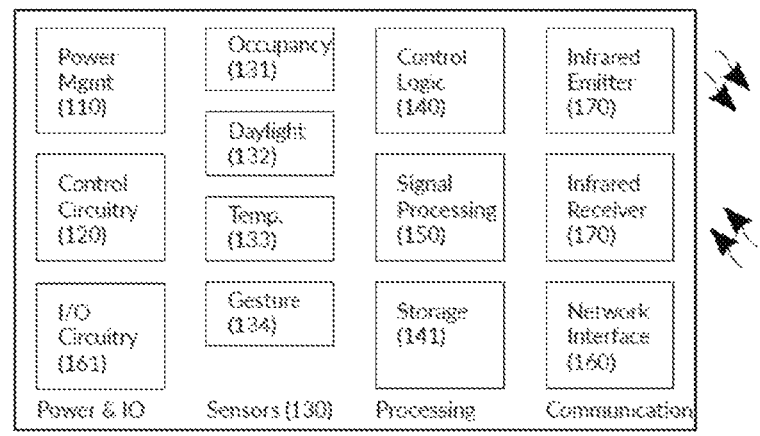
FIG. 1 is a schematic view of a luminaire control device.

FIG. 1 is a schematic view of a luminaire control device that automatically creates functional associations using infrared data transmission on a decentralized network in accordance with one embodiment. The luminaire control device may operate and control one or more luminaires. A luminaire may comprise a luminaire control device, one or more illumination element such as LEDs or bulbs, and fixtures or housing. The control device may be in the same housing as the rest of the components of the luminaire, but may alternatively be next to or connect to the luminaire.

Luminaire control device 100 may comprise one or more of the following sub-systems: power management circuitry 110, control circuitry 120, various sensors 130, including but not limited to occupancy sensor 131, daylight sensor 132, temperature sensor 133 and gesture sensor 134, control logic processing 140, data storage and memory 141, digital signal processing 150, network communication interface 160, input interface 161, and visible or infrared communication circuitry 170.

In an embodiment, luminaires and associated sensors form a functional association without using wiring connections or manually using network addresses to assign luminaires to membership in the functional association.

Luminaires may do so by sharing data between control devices 100 on a communications channel. The data may include sensor or luminaire data but also include messages for control, configuration and/or query. The communications channel may be a free space optical communication channel using visible or near infrared light. In some embodiments, the data may be shared on wired networks such as Ethernet, or another lower power wired network. The data may be shared on a wireless network using Bluetooth, Wi-Fi or similar technology, in addition to the optical communications mentioned above.

The luminaires may communicate with other aspects of a LMS such as a central controller, manually operated light switches, as well as other building automation devices such as HVAC components and third party devices. Signals from some of these devices may constitute high priority signals which override luminaire device control. For example, the operation of a manually operated light switch, or dimmer switch may override occupancy or daylight sensors. The communication media may be a hybrid system with different devices communicating on different networks interconnected by interfaces or through interconnecting devices.

Luminaire data, such as historical sensor data, luminaire output levels and control data may be shared between luminaires. Control data may include coefficients for PID (proportionate-integrate-differential) controls. The data for a luminaire may be encoded in the communication signal produced by the control device.

A control device that receives the communication signal may analyze the luminaire data of the transmitting control device. More than one control device may receive the signals and data. Data received by a device may be compared it to its own data, including historical sensor data and control data.

Two or more automation objects, control devices and their luminaires, may form a logical association based on common patterns contained in the historical data. Devices may form a logical association and their operation will be synchronized only for devices where the datasets meet a function specific evaluation criteria.

The similarity criteria may continually be evaluated in real time to achieve dynamic membership in the functional association. In this embodiment, devices will remain synchronized while their luminaire data continues to meet the similarity criteria and will automatically exit the functional association when this criteria is not met.

Figure 2:
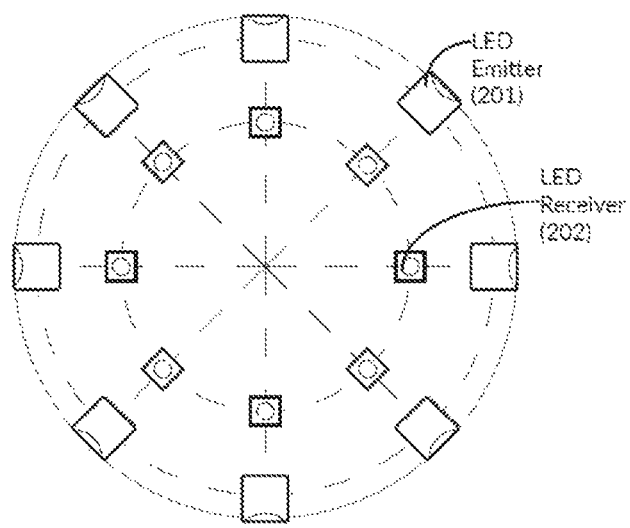
FIG. 2 is a bottom view of a transceiver for a luminaire control device of FIG. 1.

FIG. 2 illustrates one embodiment of the free space optical communication circuitry 170. Transmitter 200 may consist of one or more infrared LED emitters 201 and one or more infrared LED receivers 202. The emitters and/or receivers may be arranged in a radial distribution pattern. The infrared LED receivers may consist of a photo diode tuned for the visible or near infrared wavelengths of light being emitted by the emitters. The emitter or emitters on transmitter 200 may emit light in all directions to reach a receiver or receivers located on another control device 100. The emitter may communicate on a line-of-sight directed link, a directed non-line of sight link or a diffuse link.

Figure 3A:
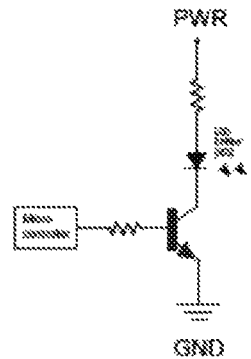
FIG. 3A is a circuit diagrams for transmitting signals.

With reference to FIG. 3A, an emitting circuit may consist of an emitter 301, comprising an infrared LED, and a micro-controller capable of producing a communication signal. Resisters and transistors may be used to apply suitable power to the emitter 301.

Figure 3B:
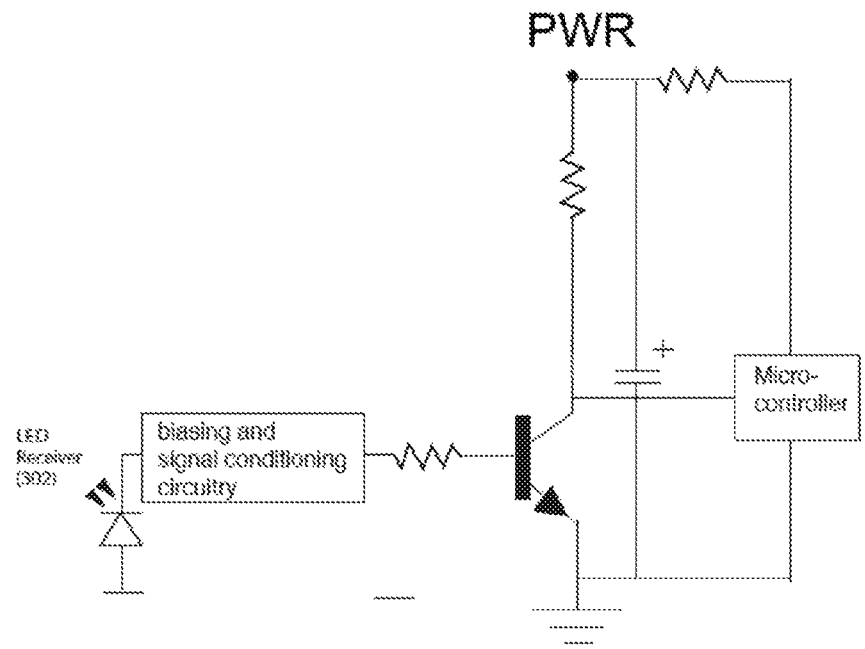
FIG. 3B is a circuit diagram for receiving signals.

With reference to FIG. 3B, the receiving circuit may comprise a receiver 302 such as a photosensitive diode, and a micro-controller, capable of receiving a communication signal. Emitter 301 and receiver 302 can additionally include any circuitry operative to control, produce and receive infrared communication signals, including timing circuitry, filters and processing circuitry.

Figure 4:
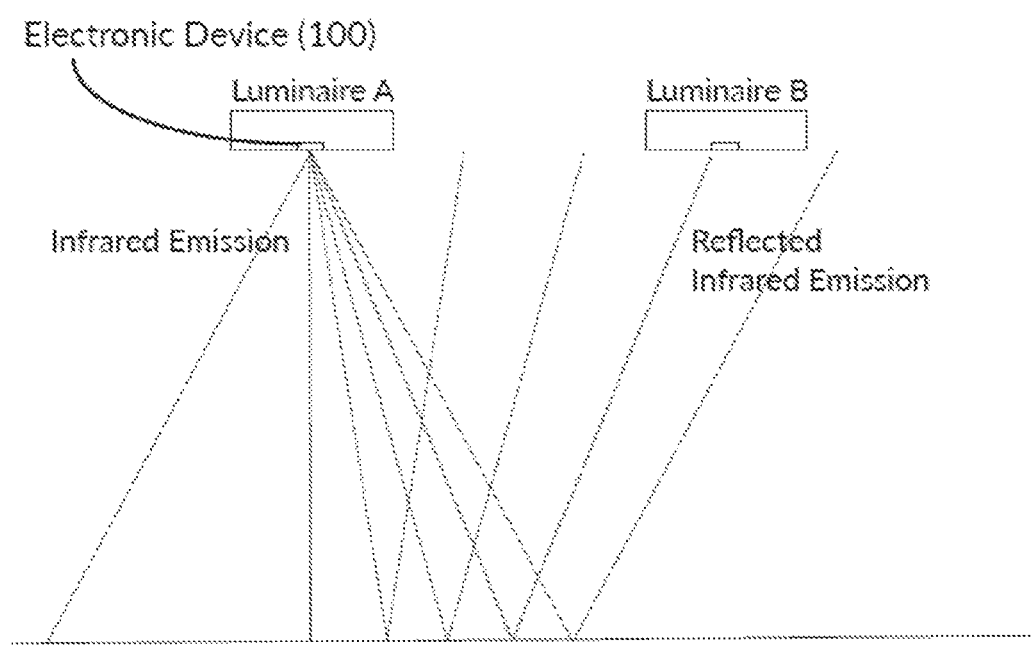
FIG. 4 is a schematic view of two luminaires indicating the transmission and receiving of infrared signals.

With reference to FIG. 4, two instances of control devices 100 are shown in proximity to each other. Each control device may be on, within, or connected with a luminaire. In an embodiment, the two control devices may communicate using an infrared diffuse link. This link may include infrared signals reflecting off the ground or floor to reach the second device. Both devices may be equipped with an emitter and receiver to allow two-way communications. While two devices are shown, but multiple devices may communicate simultaneously or multiple devices may receive signals from a single device.

Figure 5A:
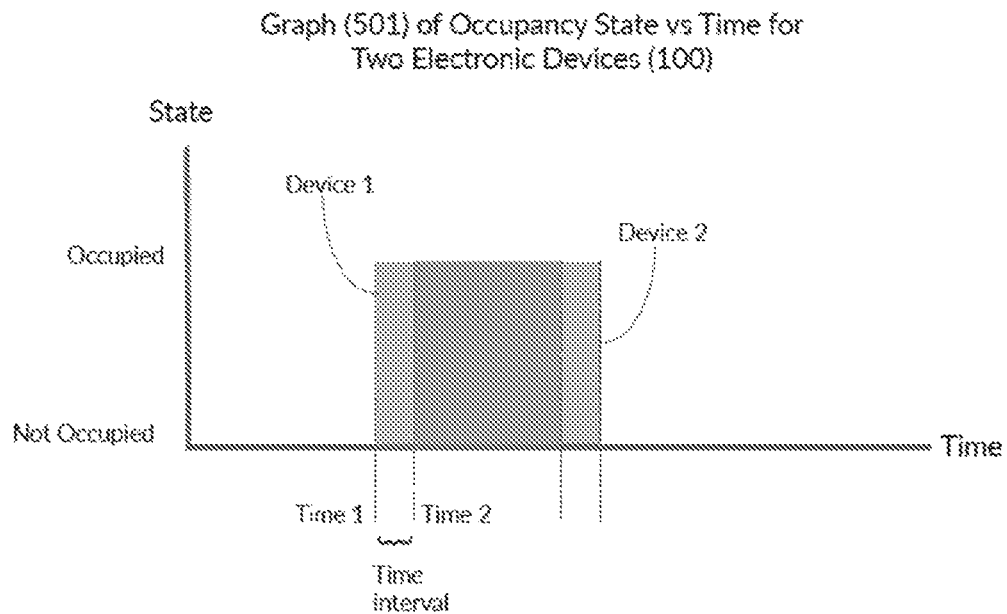
FIG. 5A is a representation of the occupancy detected for two luminaire control devices.

With reference to FIG. 5A, a graph that represent an example of the time-value pair of occupancy readings for two devices is shown. The time interval between occupancy events may be used in the analysis by both devices to determine membership in a functional association.

The historic data may represent a sequence of historic time values when occupancy was detected by a given device. For example, this may include a list of the times when occupancy was detected and when non-occupancy was detected or the start and end times for when occupancy was detected. The historical data may include the time values for the last several days, weeks, months or even longer. The data may be stored at each device in memory 141 associated with the control circuitry 120 of the device 100.

The sensor data may be stored in storage 141 on a control device. Such storage may comprise volatile or non-volatile memory. The control circuitry 120 may record each change in sensory value, such as occupancy, or the state of the sensor periodically and store the state with the time in the memory.

Another device that receives the luminaire data from a neighbouring control device may compare the data with its own luminaire data. This luminaire may include its own local historic occupancy detection time values. With reference to FIG. 5A, the occupancy detection of a first device is shown overlaid with the occupancy of a second device and indicates that the second device detected occupancy a short time later than the first device by the time interval indicated.

Control devices may share their luminaire data with the neighbouring devices. This may be done by determining the signal strength of nearby devices and implementing a cut-off power level to determine devices that communication with a suitably strong signal, and therefore are likely close by. Using a free-space communication system such as visible or infrared light may be used which physically limits the distance of the communications. Alternatively, neighbouring devices may be manually or automatically determined based on the floor plan and communicated to all the devices.

The control devices may use a protocol for resolving conflicts on the transmission media. For example, the devices may pause transmission when a conflict is detected and resume a period of time later if no other device is transmitting at that time.

The devices may join the same functional association if the time values of each occupancy detection event within the sequences occur within a specific margin of time. The margin can be variable and dynamic and can be automatically tuned on-site using a variety of machine learning algorithms in order to use the most optimized setting for the operating conditions. A different weighting score can be assigned to each entry in the historic sequence to allow for more emphasis to be placed on certain time entries, such as the most recent entry, than others. This paradigm for determining membership in a functional association is based upon the similarity of historic data that is shared on a decentralized network of control devices.

A device that receives data from and shares data with two or three nearby devices, for example will compare all the historic data from the other devices with its own data to determine which of the neighbouring devices have similar sequences. It may form a functional association with some, all or none of the nearby devices.

Figure 5B:
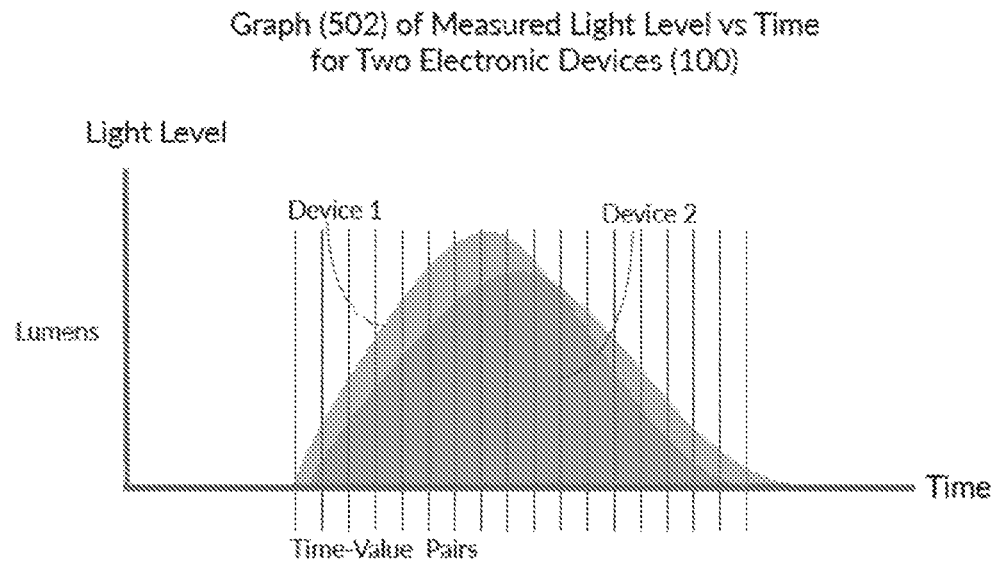
FIG. 5B is a representation of the measured light levels for two luminaire control devices.

With reference to FIG. 5B, a graph represents an example of the time value pair for a set of daylight readings for two luminaires. The difference in light levels at each time interval is used in the analysis by both luminaires to determine membership in a functional association. The graph in FIG. 5B indicates the lumens, or light intensity, detected by light sensors for each of the devices, such as over a period of a day. The graph indicates that the first device detected a higher amount of light in the first part of the time period represented, while the second device detected more light in the second part of the time period. Each time-value pair may have a different weighting factor in order to place a higher degree of priority on specific data sets within the current and historic record. For example, recent time entries or time entries during office hours may be given a higher priority.

Devices may use fuzzy logic, machine learning algorithms or are a fixed set of rules for determining the closeness of the historical data and therefore the membership in a functional association.

Devices with similar day light detection values may form a functional association and coordinate light levels of the luminaire. For example, all the control devices within the functional association may use the light sensor input from one of the devices, the control devices may share the same coefficients for PID algorithms or all the control devices may set the same output level as each other.

Figure 6:
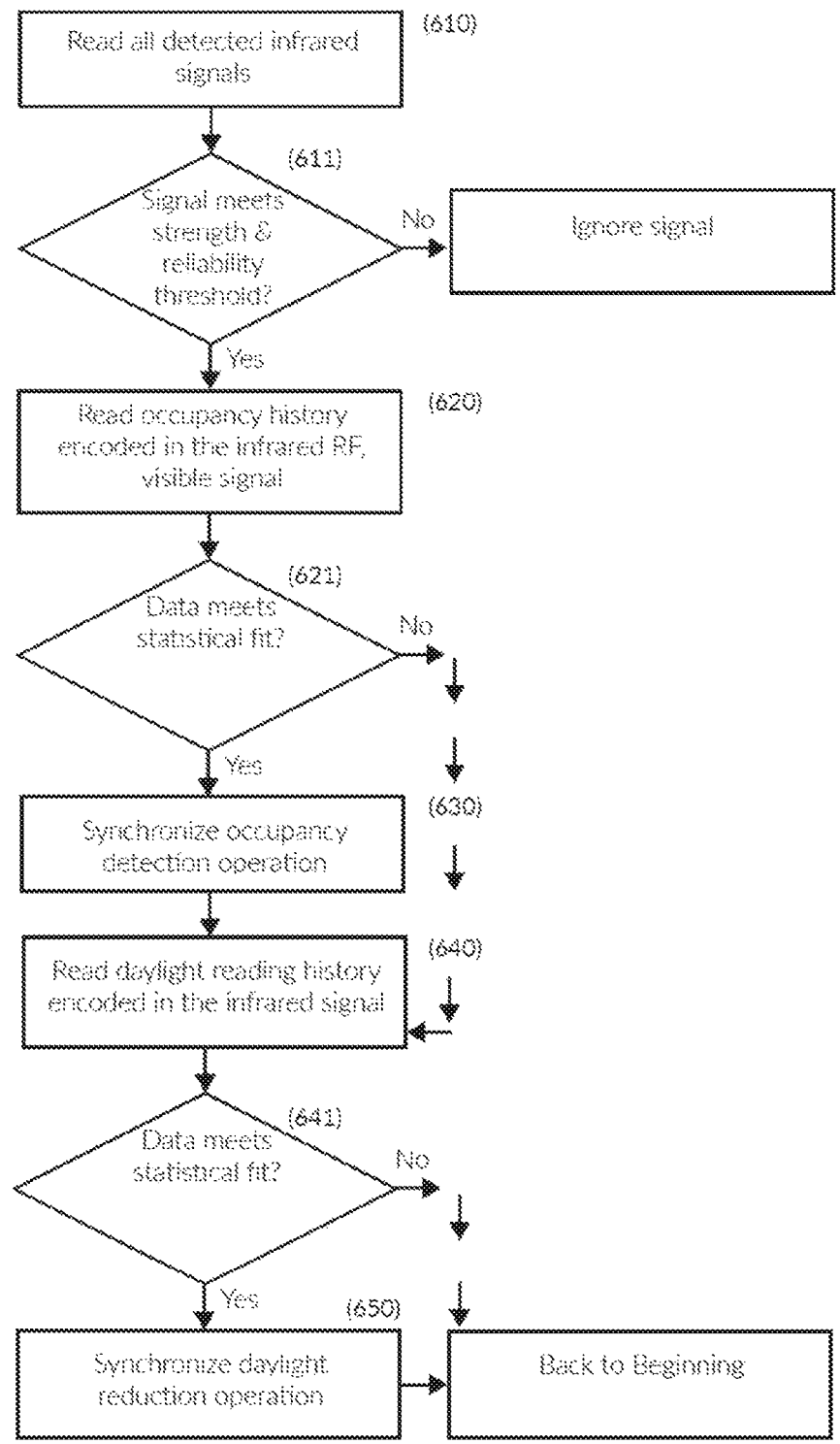
FIG. 6 is a flow chart for establishing grouped luminaires from occupancy and daylight detection.

FIG. 6 is a flow chart for a high level process that may be used for receiving, processing and forming a functional association with one or more other devices. Process 600 may be performed by control device 100.

Process 600 may begin with block 610. At block 610, communication signals received by control device 100 are read and analyzed. Such communication signals may be received by infrared transceiver. The signals may be infrared signals but in some implementations may be radio frequency or visible light. At block 611, a decision is made on whether or not the received signal meets physical criteria based on a variable threshold, such as the signal being too weak or has too much noise. If known, from identifiers or other parameters of or in the signal, the control device may be determined if the signal originates with a neighbouring device.

At block 620, signals that meet the physical criteria may be decoded as luminaire data from a neighbouring device and for data that relates to occupancy detection, the time-value pair of the occupancy data encoded within the signal may be read and analyzed. As noted in FIG. 6, the signal may be infrared, RF (radio frequency), or visible light. This may include current and historical data from a neighbouring device.

In block 621, a decision is made for occupancy detectors as to whether or not the time-value pair meets a variable set of similarity criteria of the historic record of occupancy events.

At block 630, control devices that meet historic similarity criteria for occupancy may synchronize their operation to behave in unison. This may mean that all devices in the functional association are set to the occupied state if any one device in the functional association detects occupancy and that no device in the functional association is set to the vacancy state until all devices in the functional association detect vacancy. In this way, for example, the luminaires in the functional group may all turn on simultaneously if any of the occupancy detectors detect occupancy and may all turn off simultaneously once none of the detectors in the functional association detect occupancy. As mentioned above, the behaviour may be more complicated with, for example, hold times and transition fades.

At block 640, signals that meet the physical criteria may be decoded and the time-value pairs of daylight sensor data encoded within the signal are read and analyzed for control devices that utilize daylight sensors.

In block 641, a decision may be made as to whether or not the time-value pair meets a variable set of similarity criteria of the historic record of daylight events for the control device. As described above, this may include matching of sensor data, control data and other data within a comparison algorithm.

At block 650, devices that meet historic similarity criteria for daylight reduction may synchronize their operation to behave in unison. This may mean that the measured daylight readings used as an input to a PID control loop are averaged among all members of a functional association. It may also mean that only the daylight readings of one device are used as the measured value by all devices in their PID control loops.

A device that contains multiple sensors may belong to more than one functional association. For example, two devices can synchronize their operation in response to occupancy detection but not for daylight response. Functional associations may overlap each other or be nested in one another.

Moreover, the membership in the functional association may be dynamic. The device may share their historical time values periodically and re-evaluate their membership in the functional associations. If a new device is installed, it may add itself to functional associations. Similarly if a device is relocated or if the layout of the space near the device is altered, the functional associations for the device may change. Such re-evaluation may take place periodically, such as once a daily, or once a week or in near real time, such as every second or minute.

The control devices may broadcast all its luminaire data regularly or broadcast current data more frequently and its historic data less frequently. Once luminaires have determined functional associations, the results of the associations, such as luminaire identifiers that have joined a group, may be communicated to a central controller, either from control device to control device in a peer-to-peer network or through a different network.

For determining associations of automation objects using daylight information, it may be beneficial to send a reduced set of information, particularly historical information, to neighbouring devices to reduce the amount of bandwidth required. In an embodiment, a model is used to determine an integral and variance of historical daylight information. If all historical data were communicated to neighbouring devices, bandwidth would increase in proportion to the number of time samples and the number of devices.

On a control device, sensor data from a daylight sensor 132, may be preliminary processed such as filtered and averaged. The preliminary processing may reduce the impact of temporary shadows, such as a passing cloud or the sensor being obscured.

An integral of the daylight sensor data may be calculated over a time period. Depending on the implementation, this may be done by simply adding together the sensor data over a period of time, to represent the cumulative amount of luminous flux over the time period. The data may be normalized over the cumulative period. The integral may be calculated over a period of time, such as a day, or a shorter period such as one or more hours. An integral has the advantage of resulting in a single numeric value regardless of the time period used. Devices that receive similar daylight will have similar integrals.

Figure 7:
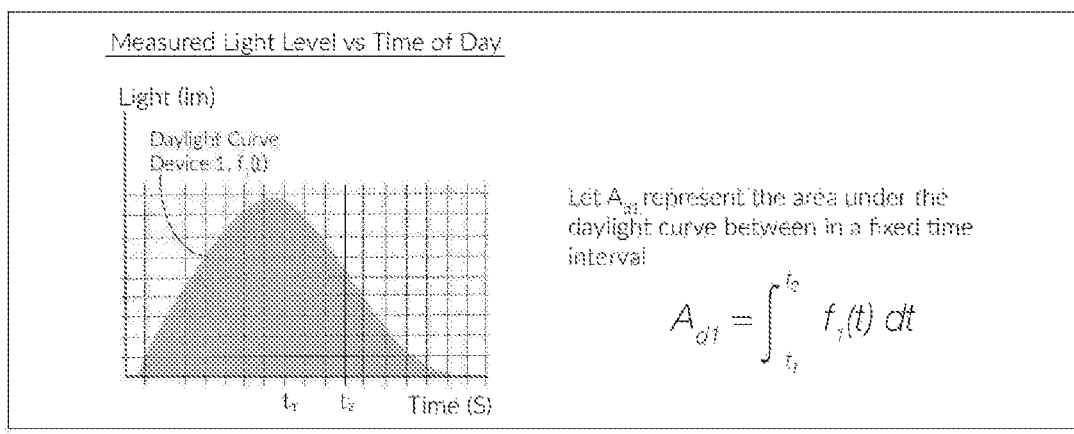
FIG. 7 is a representation of the calculation of an integral of light sensor data.

A representation of the calculation of an integral of light sensor data is shown in FIG. 7. An integral may be calculated over a period t1 to t2 as shown in FIG. 7 and the sensor data may be as indicated in the curve.

As implemented on a control device, sensor data may be received or recorded periodically, such as every millisecond, every second, or some other period. The sensor value may be added on each interval or some other interval to arrive at a cumulative value over a period of time.

In addition, a control device may calculate a variance value for daylight sensor data. A variance value may serve to distinguish between daylight sensor data that would otherwise be similar if only compared on the basis of the integral value.

Figure 8:
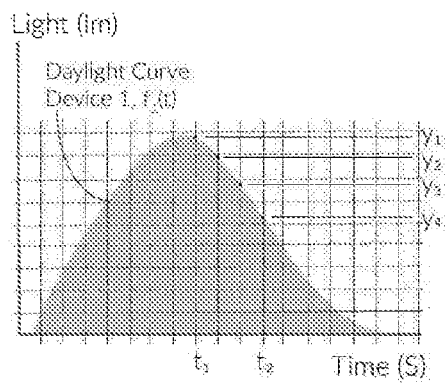
FIG. 8 illustrates a variance being calculated as the average of the difference between sensor values and the average over the time period.
Figure 8:
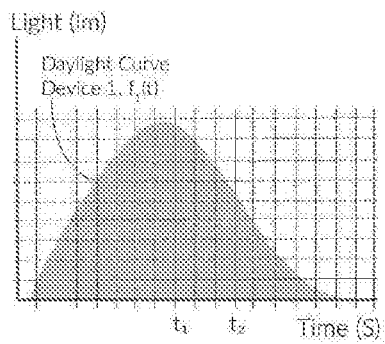

A variance may be calculated as the average of the difference between sensor values and the average over the time period as shown in FIG. 8. The period of time used for determining the variance may be the same period used for calculating the integral. Represented below is the calculation for a variance over the time period $t_1$ to $t_2$ for generalized daylight data have sensor values $y_1$, $y_2$, $y_3$ and $y_4$ at time intervals over the time period.

Calculating a variance can be determined using mathematical operations typically found on embedded processors. A variance has the advantage that it can be represented as a single numeric value, regardless of the length of the time period or the number of samples.

As a result, in an embodiment, a control device need only send two numeric values, the integral and the variance, to neighbouring devices and similarly receive two numeric values from the neighbouring devices. This can reduce the amount of data that needs to be communicated, reducing bandwidth, processing power and memory requirements.

Within a device, information about the daylight sensor for the current device and of neighbouring devices needs to be tracked for a comparison to be made as to whether the device should be part of an association with one or more neighbouring devices.

Figure 9:
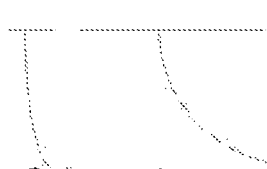
FIG. 9 illustrates an example of an array format for organizing and/or storing the daylight data.

In an embodiment, the daylight data may be organized and/or stored in an array format as shown in FIG. 9. The array may have a first column for information relating to the current device. Columns 2 through n, correspond to one or more neighbouring devices, where the number of neighbouring devices is n−1.

As shown in FIG. 9, the row may contain an address or identifier of a device, including the current device as well as any neighbouring devices with which it communications. The identifier may be a number, but may alternatively be an alpha numeric value, or another form of a unique identifier such as an UUID.

The second row in the array in FIG. 9 may contain the integral value for each of the devices. The first column may have the integral calculated for the present device. The remaining columns may have the integral value communicated from any neighbouring devices. As mentioned above, the integral value may be normalized or otherwise have determined upper limit, indicated as 'a'.

The third row in the array in FIG. 9 may contain the variance value for each of the devices. The firm column may have the variance calculated for the present device. The remaining columns may have the variance value communicated from any neighbouring devices. As mentioned above, the variance value may have some upper limit, indicated as 'v'.

The array in FIG. 9 may contain a further row that indicates whether any neighbouring devices are part of the same group for the purposes of the daylight. This indication may be updated periodically based on the integral and variance information received from neighbouring devices. As updated integral and variance information is received, a determination may be done to determine if the device should remain part of a group.

The array in FIG. 9 may contain a further row that indicates whether neighbouring devices are within line-of-sight of the present device. This may be determined based on the communication means, such as IR communication, or other attributes regarding the neighbouring device. As discuss above, the IR link may be line of sight or diffuse. If a neighbouring device is not within line of sight, it may be excluded from further consideration as a group member. A similar line of sight requirement may be used to determine an occupancy group as well. If the IR link is diffuse, then the link may still be used as a threshold requirement but the device and a neighbouring device may not actually be line of sight if the devices are still in communication over the diffuse infrared link.

The array in FIG. 9 may contain a further row that contains the current daylight sensor reading from any neighbouring devices. The reading may be pre-processed prior to be being communicated and received by the device. Whether the neighbouring device is considered part of a group with the device will affect whether the daylight sensor reading is considered as part of whether to change the output of the luminaire.

While the information on the present and neighbouring devices is described as being represented in a two dimensional array, alternative representations may be used to represent the information on the device as received from neighbouring devices. Single dimensional arrays, hashes, memory maps are some of these alternative representations.

To determine the group status of a neighbouring device, a comparison may be made between the integral value and variance value of the device with that of each neighbouring device as shown in FIG. 10.

As shown in FIG. 10, if the difference in integral values and the difference in variance values are less than similarity thresholds, then the neighbouring device is a candidate to be part of a group.

In other embodiments, a mean or median value of the sensor data over a period of time may be calculated and compared to similar values calculated by neighbouring devices. This comparison may be done for each neighbouring device.

In an array representation, column-wise subtraction may be performed for each neighbouring device. The local integral is a scalar value from which each of the remote integral values are subtracted. The result from this step is a vector of scalar values with n−1 elements. This vector is than compared to a threshold scalar value resulting in binary vector of n−1 elements. The same process is used for the variance values. The Group Status is the result of a logical AND of resulting binary vectors.

The $\varepsilon_1$ and $\varepsilon_1$ values may be selected to provide a suitable size of groups. A larger value will tend to result in larger groups, while a smaller value in smaller groups. The $\varepsilon_1$ and $\varepsilon_1$ values also allow for the similarity limit to be set and adjusted onsite and in real time by automated algorithms.

Each device also contains processing logic to deal with scenarios where it must choose between multiple competing group formations. This may occur when a device finds that multiple devices fit within a similarity threshold but the extremes of these devices do not fit in the similarity threshold.

In this case, the device must decide which devices to pair with. For example, in a scenario where there are 10 devices, and each of them have a linear degradation in average light level, a device in the middle has to choose which devices it will group with. More broadly, the network of devices have to choose the optimal grouping across these 10 devices.

This problem can be solved by determining all possible groupings and choosing the grouping that results in the lowest light output. This is done by considering the average reading of all group combinations and choosing the group combination that minimizes the overall set point.

For occupancy data, a comparison may be made with neighbouring devices based on recent occupancy/vacancy detection events. The local device may record the time of the more recent local occupancy/vacancy detection and begin a timer to record the time elapsed until occupancy/vacancy is detected by its neighbours. A neighbouring device may send a message to nearby devices when it detects a change in its occupancy state. As described above, the message may be communicated using a line-of-sight communication method, or other wireless or wired communication.

The timer may lapse after a given amount of time and tracking of neighbouring device not monitored after that time. For example, if the time lapses 5 minutes after a occupancy/vacancy event, a occupancy/vacancy event by a neighbouring device may not recorded, as it is too distant.

Alternatively, a device may record the time, such as using an internal clock, of an occupancy/vacancy event. The time of events detected by neighbouring devices may also be recorded if they are within a determined time period of the event of the present device. As described below, a score may be calculated on the degree of proximity between the events.

A score adjustment may be calculated based on the time difference between the occupancy/vacancy detection event at the device and that of a neighbouring device. Narrow time intervals will be scored highly, while long time intervals (or intervals that exceed the timeout limit) are scored with a low or a negative value.

Figure 11:
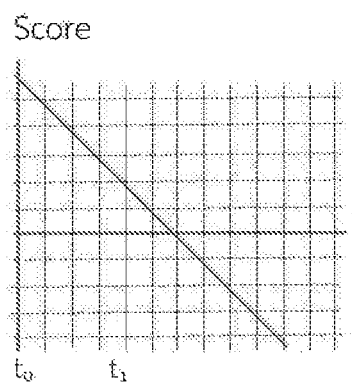
FIG. 11 illustrates examples of scoring curves.
Figure 11:
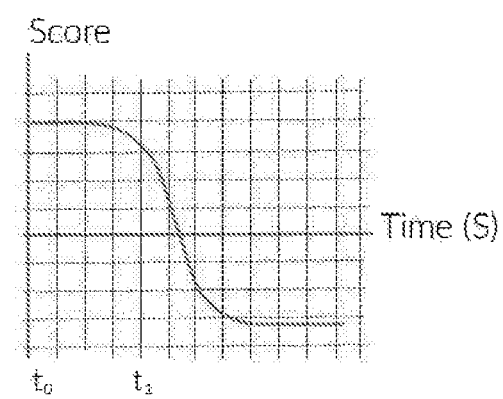

The score adjustment may be calculated in a variety of ways depending on the specifics of the desired implementation, but generally, the longer the time difference, the lower the score. A scoring curve (examples of which are shown in FIG. 11) may be used to determine a score adjustment based on the time difference. For example, the score may be linear with the difference in time or some linear scoring relationship as shown on the left side of FIG. 11. In a non-linear scoring relationship as shown in the right side in FIG. 11, the score may be roughly fixed if the time difference is less than a threshold but the score may be substantially lower if the time difference is larger than the threshold. Such a non-linear relationship may be represented or calculated using an exponential function such as $$S = \frac{1}{1+e^{-U}} - 1$$

In an embodiment, the score may be incorporated into a running history of cumulative scores that is updated periodically. The cumulative running score may be weighted by a weight factor, represented in FIG. 12 as a numeric value 'a'. The device may form an occupancy group with a neighbouring device is the value of the history function is above a given threshold. The cumulative score may have maximum and minimum value, either determined by constraints of the processing of the device or to limit the deviation of the score from a mean.

The cumulative history and occupancy group status of a neighbouring device may be stored in an array in a similar manner as described above for daylight occupancy.

As an example, on a first device, an occupancy event may be detected. A short time later, the first device may receive a communication from a neighbouring device that it also detected an occupancy event. The score for this may be calculated as a '2'. If on the first device, the neighbouring device has a cumulative history score of zero, and the weighting factor is '1', the cumulative history score may be updated to 2. If a couple of more vacancy and occupancy events are detected and similar messages are immediately received from the neighbouring device, the cumulative history score may soon be 6. If the threshold $\varepsilon_3$ is, for example 5, then the first device may decide that the neighbouring device should be part of the same occupancy group. If this determination is made, then if an occupancy message is reported by the neighbouring device, the first device may immediately turn on, even if the first device does not detect occupancy. If occupancy at the first device is detected a short time later, the cumulative score of the neighbouring device may be further increased.

If, for example, a temporary wall is placed between the first device and the neighbouring device, the first device no longer detects occupancy within a short time of the neighbouring device. For each occupancy/vacancy event where no timely message is received from the neighbouring device, the cumulative score for the neighbouring device is decreased. When the cumulative score is no longer larger than the threshold 83, the first device may no longer consider the neighbouring device as part of the same occupancy group and therefore no longer respond to occupancy/vacancy messages. Even if the neighbouring device is no longer part of the occupancy group, the first device may still update the cumulative score for the neighbouring device in case the circumstances change, such as the temporary wall is removed. In this way, the association is automatic and a technician is not required to manually re-associate the fixtures on either side of the temporary wall.

Such calculations and adjustments as to occupancy group membership may be completed for each neighbouring device for each occupancy/vacancy event on the first device.

In addition, if a neighbouring device fails or is not responding to, or sending updated sensor information, a device may ignore or no longer rely on its sensor information to determine its state. For example, a device may ignore a daylight sensor in a PID control loop if the daylight sensor is no longer responding or generating useable information.

In comparison to a low voltage LMS, the approach described above has the advantage of not requiring dedicated wiring to define a functional association. With respect to a wired or wireless digital LMS configured by way of network addresses, this approach has the advantage of not relying exclusively on a network address or any programming by a user to define the functional association.

Tasks that may be inherently complex to implement in a digital, address based, LMS, such as programming functional associations in response to the position of a movable partition wall, may be done inherently by virtue of the dynamic nature of the functional associations and the periodic sharing of historical data between the devices.

A control device, or the system of luminaires may generate an identifier that can be shared with a LMS controller or operator. A controller or operator may use the identifier to re-configure, or override aspects of the functional association. For example, the controller or operator may re-assign a device to a different functional association, combined or split a functional association. In some instances, the controller or operator may re-configure the algorithm used to determine if devices are sufficiently similar to form a functional association. The controller or operator may be local to the luminaires or may be remote, such as at a municipal, regional or national control centre.

In some locations, regulations or use cases may require different functional associations and response parameters. For example, hold times may be different in bathrooms as compared to broom closets.

A control device that may contain some or all of an infrared communication circuitry (consisting of an emitter and a receiver), a set of environmental sensors (such as daylight and occupancy), and signal analysis and control logic processing capabilities. The control device may also have a mechanism to controls the state of an actuator such as an luminaire, a variable valve controller or other types of building automation appliances or equipment. The device can be part of, mounted on or adjacent to the unit it is controlling.

Multiple control devices may be installed throughout a building space, such as by being connected with or associated with each of the devices being controlled by the LMS. The device may not require line of sight to transmit messages on the (free space optical) FSO communication channel. The communication message would have sufficient signal to noise ratio to overcome sources of data corruption, such as natural sunlight.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A control device for associating with one or more neighbouring control devices based on occupancy sensors, wherein the control device comprises:
   a communications transceiver for sending and receiving communication signals with the one or more neighbouring control devices, that receives the signals when the one or more neighbouring control devices detects an occupancy event;
   an occupancy detector that detects an occupancy event upon the presence or absence of people in the vicinity of the control device; and
   a processor for calculating the time difference between the detection of an occupancy event detected by the occupancy detector and the receipt of a signal when the one or more neighbouring control devices detects an occupancy event; and determining the degree of similarity between each of the one or more neighbouring control devices and the control device and a membership of the control device in a group of control devices, wherein the processor is to operate a luminaire on the basis of the occupancy detector and on the basis of the signals received from the one or more neighbouring devices that are members of the group of control devices.

2. The control device of claim 1, where determining the degree of similarity comprises, maintaining a cumulative score for each of the one or more neighbouring device and adjusting the cumulative score based on the calculated time difference.

3. The control device of claim 1, where adjusting the cumulative score is based on a scoring curve that determines a score adjustment based on the calculated time difference.

4. The control device of claim 2, where membership of a group of control devices is determined if the cumulative score is above a threshold value.

5. The control device of claim 1, wherein the processor is to activate the luminaire when occupancy is detected by the occupancy detector or occupancy is communicated by any one of the control devices of the membership group.

6. A control device for associating with one or more neighbouring control devices based on daylight sensors, the control device comprises:
   a communications transceiver for sending and receiving communication signals with the one or more neighbouring control devices, that receives the signals representing the daylight sensor amount of the one or more neighbouring control devices;
   a daylight sensor that measures the amount of ambient daylight in the vicinity of the control device; and
   a processor that determines the difference between the daylight sensor amount and the daylight sensor amount received from the one or more neighbouring control devices and determines the degree of similarity between each of the one or more neighbouring control devices and the control device and a membership of the control device in a group of control devices, wherein the processor is to operate a luminaire on the basis of the daylight sensor and on the basis of the signals received from the one or more neighbouring devices that are members of the group of control devices.

7. The control device of claim 6 wherein the processor is to determine the difference between the daylight sensor amount and the daylight sensor amount received from the one or more neighbouring control devices by calculating a numeric integral and a variance of the daylight sensor amount and receiving a numeric integral and a variance of the daylight sensor amount from the one or more neighbouring control devices and calculating a difference between the numeric integrals and the variance of the daylight sensor amounts.

8. The control device of claim 6 wherein the processor is to determine the degree of similarity between each of the one or more neighbouring control devices and the control device and the membership of a group of control devices by associating each of the one or more neighbouring control devices with an alternative group of control devices if the difference is less than a threshold amount.

* * * * *